United States Patent
Cordeiro et al.

(10) Patent No.: US 10,771,997 B2
(45) Date of Patent: Sep. 8, 2020

(54) RADIO RESOURCE MEASUREMENT TECHNIQUES IN DIRECTIONAL WIRELESS NETWORKS

(71) Applicant: Intel Corporation, Santa Clara, CA (US)

(72) Inventors: Carlos Cordeiro, Potland, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/361,161

(22) Filed: Nov. 25, 2016

(65) Prior Publication Data

US 2017/0134979 A1 May 11, 2017

Related U.S. Application Data

(63) Continuation of application No. 14/466,375, filed on Aug. 22, 2014, now Pat. No. 9,538,412, which is a
(Continued)

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 17/24* (2015.01);
(Continued)

(58) Field of Classification Search
CPC ..... H04W 84/18; H04W 84/12; H04W 88/06; H04W 40/02; H04W 4/02; H04W 74/04;
(Continued)

(56) References Cited

U.S. PATENT DOCUMENTS 7,515,878 B2    4/2009  Zhang et al.
9,178,593 B1 *  11/2015 Liu ....................... H04B 7/0834
(Continued)

FOREIGN PATENT DOCUMENTS

| WO | 2006031495    | 3/2006 |
| WO | 2008016806 A1 | 2/2008 |
| WO | 2009066622 A1 | 5/2009 |

OTHER PUBLICATIONS

European Search Report from European Application No. 14/174,660, completed Jul. 11, 2017, 15 pages.
(Continued)

*Primary Examiner* — Golam Sorowar
(74) *Attorney, Agent, or Firm* — Eversheds Sutherland (US) LLP

(57) ABSTRACT

Techniques for radio resource measurement (RRM) that support directionality, as well as scheduled media access techniques are described. For instance, a measurement request may be transmitted from a first device to a second device. This measurement request directs the second device to take one or more measurements of a wireless channel. Various characteristics for the one or more measurements may be included in the measurement request. For example, the measurement request may indicate at least one directional parameter and at least one timing parameter for the one or more measurements. In response to the request, the first device receives a measure report that includes measured values for each of the one or more measurements.

18 Claims, 6 Drawing Sheets

Related U.S. Application Data continuation of application No. 12/459,264, filed on Jun. 26, 2009, now Pat. No. 8,843,073.

(51) Int. Cl.
| | |
|---|---|
| *H04W 72/08* | (2009.01) |
| *H04B 17/24* | (2015.01) |
| *H04B 17/309* | (2015.01) |
| *H04W 72/04* | (2009.01) |
| *H04W 24/08* | (2009.01) |
| *H04W 84/18* | (2009.01) |
| *H04B 17/345* | (2015.01) |

(52) U.S. Cl.
CPC .......... *H04B 17/309* (2015.01); *H04W 24/08* (2013.01); *H04W 72/0446* (2013.01); *H04W 72/085* (2013.01); *H04B 7/0619* (2013.01); *H04B 17/345* (2015.01); *H04W 84/18* (2013.01)

(58) Field of Classification Search
CPC ....... H04W 8/005; H04W 4/206; H04W 8/26; H04W 28/06; H04W 72/1278; H04W 4/06; H04W 72/005; H04W 24/10; H04W 74/00; H04W 76/02; H04W 80/00; H04L 12/189; H04L 67/18; H04L 12/2832; H04L 2012/2841; H04L 45/00; H04L 63/20; H04L 12/1868; H04L 27/2613; H04L 45/34
USPC ....... 370/208, 252, 255, 312, 315, 328, 329, 370/331, 338, 345, 392, 445; 455/411, 455/423, 450, 509, 456.1, 452.2, 518, 455/554.1, 562.1; 705/14.1, 21, 26.1, 29
See application file for complete search history.

(56) References Cited

U.S. PATENT DOCUMENTS

| | | | |
|---|---|---|---|
| 2004/0185853 A1 | 9/2004 | Kim et al. | |
| 2004/0219926 A1 | 11/2004 | Kim et al. | |
| 2006/0063492 A1 | 3/2006 | Iacono et al. | |
| 2006/0234660 A1 | 10/2006 | Kwak | |
| 2006/0258286 A1* | 11/2006 | Qi | H04W 76/14 455/41.2 |
| 2007/0002757 A1 | 1/2007 | Soomro et al. | |
| 2007/0064655 A1* | 3/2007 | Ruuska | H04W 28/18 370/332 |
| 2007/0098123 A1* | 5/2007 | Hara | H04B 7/0617 375/347 |
| 2008/0259811 A1* | 10/2008 | Cordeiro | H04W 24/10 370/252 |
| 2008/0310372 A1 | 12/2008 | Li et al. | |
| 2009/0001094 A1 | 1/2009 | Inoue et al. | |
| 2009/0010194 A1 | 1/2009 | Seok et al. | |
| 2009/0011768 A1* | 1/2009 | Seok | H04L 41/5003 455/450 |
| 2009/0116444 A1* | 5/2009 | Wang | H04B 7/0408 370/329 |
| 2009/0135720 A1* | 5/2009 | Li | H04W 72/1263 370/232 |
| 2009/0225883 A1* | 9/2009 | Orlik | H04W 72/046 375/260 |
| 2009/0290518 A1* | 11/2009 | Gossain | H04L 1/0026 370/310 |
| 2010/0061334 A1* | 3/2010 | Gault | H04L 5/0005 370/330 |
| 2010/0093364 A1* | 4/2010 | Ribeiro | H04W 72/082 455/452.2 |

OTHER PUBLICATIONS

"IEEE Standard for Information technology—Local and metropolitan area networks—Specific requirements—Part 11: Wireless LAN Medium Access Control (MAC)and Physical Layer (PHY) Specifications Amendment 1: Radio Resource Measurement of Wireless LANs;IEEE Std 802.11 k-2008 (Amendment to IEEE Std 802", 802.11 K-2008—IEEE Standard for Information Technology—Local and Metropolitan Area Networks—Specific Requirements—Part 11: Wireless LAN Medium Access Control (MAC)and Physical Layer (PHY) Amendment 1: Radio Resource Measurement of Wireless LANs.

Interdigital Communications: "Advanced Antennas; 1-05-0435-02-000k-advancedantennas", IEEE Draft; 11-05-0435-02-000K-Advancedantennas, IEEE-SA Mentor, Piscataway, NJ USA, vol. 802. 11 k, No. 2, Jul. 20, 2005 (Jul. 20, 2005), pp. 1-20, XP017689197, slides 6 to 11, 17 and 20 *.

First Examination Report for Indian Patent Application No. 9217/DELNP/2011, dated Oct. 18, 2017, 6 pages.

European Search Report for European Application No. 17174660.5, completed Jul. 11, 2017, 15 pages.

European Search Report for European Application No. 10792522.4, dated Jun. 2017, 4 pages.

Office Action for Brazil Application No. BR122017017264-6, dated Feb. 27, 2020, 9 pages (4 pages Brazilian, 5 pages basic machine English translation).

* cited by examiner

| Regulatory Class (1 octet) | Channel Number (1 octet) | STAID (1 octet) | Beam ID (1 octet) | Measurement Method (1 octet) | Meas. Start Time (8 octets) | Meas. Duration (2 octets) | Number of Time Blocks (1 octet) | Optional Sub-elements (variable size) |
|---|---|---|---|---|---|---|---|---|
| 402 | 404 | 406 | 408 | 410 | 412 | 414 | 416 | 418 |

| Regulatory Class (1 octet) | Channel Number (1 octet) | STA ID (1 octet) | Beam ID (1 octet) | Measurement Method (1 octet) | Meas. Start Time (8 octets) | Meas. Duration (2 octets) | Number of Time Blocks (1 octet) | Meas. 1 | ... | Meas. N | Optional Sub-elements (variable size) |

FIG. 5 ated by reference in their entireties.

RADIO RESOURCE MEASUREMENT TECHNIQUES IN DIRECTIONAL WIRELESS NETWORKS

RELATED PARAGRAPH

This application is a continuation of U.S. patent application Ser. No. 14/466,375, entitled "RADIO RESOURCE MEASUREMENT TECHNIQUES IN DIRECTIONAL WIRELESS NETWORKS," filed on Aug. 22, 2014, which is a continuation of U.S. patent application Ser. No. 12/459,264, entitled "RADIO RESOURCE MEASUREMENT TECHNIQUES IN DIRECTIONAL WIRELESS NETWORKS," filed on Jun. 26, 2009, now U.S. Pat. No. 8,843,073, issued Sep. 23, 2014, which are hereby incorporated by reference in their entireties.

BACKGROUND

Wireless networks, such as wireless personal area networks (WPANs), wireless local area networks (WLANs), and/or cellular telephony networks provide for a wide array of mobile communications services. Currently, wireless networks are under development for the 60 GHz radio frequency (RF) band. Such networks intend to provide higher data rates, spatial reuse (enabled by the directional propagation properties of 60 GHz signals), directional communications, enhanced interference mitigation, and network stability.

In addition, it is planned for 60 GHz wireless networks to employ scheduled media access control (MAC) techniques, such as time division multiple access (TDMA). However scheduled media access techniques are typically not as robust as contention-based media access techniques. For example, carrier sense multiple access with collision avoidance (CSMA/CA) (which is currently employed in IEEE 802.11 networks) is often more robust in handling transmission interference.

Thus, it is desirable to ensure network robustness when scheduled MAC techniques, such as TDMA, are employed. One way to promote robustness involves the exchange of information between devices regarding the wireless environment. More particularly, such information provides for scheduled allocations that promote robust network operation.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 4 is a diagram of an exemplary channel quality histogram request format;

FIG. 5 is a diagram of an exemplary channel quality histogram report format.

DETAILED DESCRIPTION

Embodiments provide techniques for radio resource measurement (RRM) that support directionality, as well as scheduled media access techniques. For instance, embodiments may transmit a measurement request from a first device to a second device that directs the second device to take one or more measurements of a wireless channel. This measurement request may include various characteristics for the one or more measurements. For example, the measurement request may indicate at least one directional parameter and at least one timing parameter for the one or more measurements. In response to the request, the first device receives a measure report that includes measured values for each of the one or more measurements.

Conventional RRM techniques do not support directionality and scheduled access (e.g., TDMA). For instance, the Institute of Electrical and Electronics Engineers (IEEE) 802.11k Amendment to the IEEE 802.11-2007 Standard provides RRM schemes. However, these schemes were developed under the assumption of a CSMA/CA MAC and an omni-directional transmission mode.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
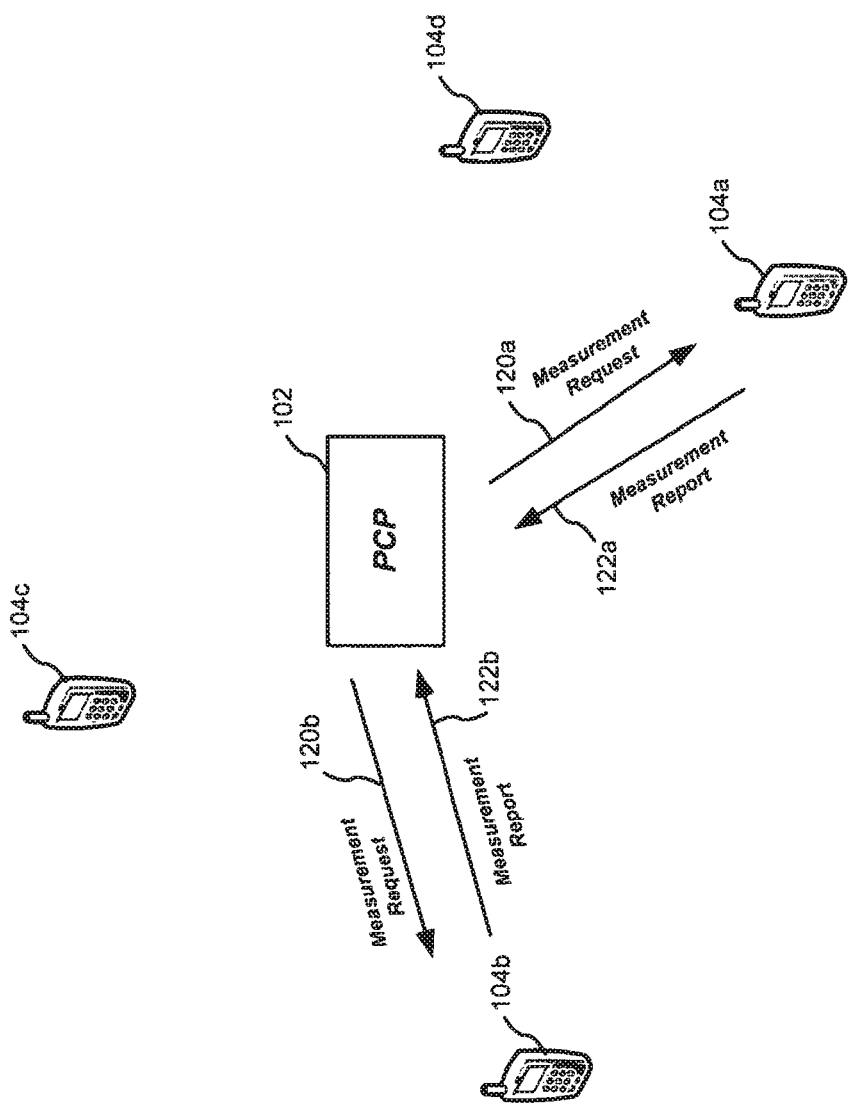
FIG. 1 is a diagram of an exemplary operational environment.

FIG. 1 is a diagram of an exemplary operational environment 100 that may employ the techniques described herein. This environment includes a central controller device (PCP) 102, and multiple stations (STAs) 104a-d. These devices may be implemented in any combination of hardware and/or software. In general operation, these devices may communicate wirelessly with each other. Moreover, in embodiments, these devices may employ multiple beams and/or directional transmissions.

PCP 102 performs various control operations, including resource allocations for STAs 104a-d. In particular, PCP 102 may manage resources within a repeating period called a TDMA frame (also known as Beacon Interval or Superframe). This may involve allocating time slots within the TDMA frame to STAs 104a-d. Such allocations may employ spatial reuse. More particularly, such allocations may overlap (completely or partially) in time.

In embodiments, allocations made by PCP 102 may be based on requests received from STAs 104a-d. In making such allocations, PCP 102 may consider characteristics regarding the wireless environment of STAs 104a-d. Details involving the determination of such characteristics are provided below.

STAs 104a-d may wirelessly communicate in accordance with resource allocations performed by PCP 102. These communications may involve transmissions between STAs 104. Also, these communications may involve exchanging transmissions with PCP 102. For example, PCP 102 may relay communications traffic between STAs. Further, PCP 102 may provide STAs 104a-d with access to one or more wireless networks (e.g., the Internet and/or wired telephony networks).

As described above, PCP 102 may consider characteristics regarding the wireless environment of STAs 104a-104d. To determine such characteristics, PCP 102 may gather information from STAs 104a-d. More particularly, PCP 102 may transmit requests to STAs 104a-d. Each of such requests may direct the receiving STA to conduct particular measurements. In turn, the recipient STA conducts the measurement(s) and transmits a report back to PCP 102. From such reports, PCP 102 may perform resource allocations that consider factors, such as interference mitigation, network stability, and so forth. For example, based on such received report(s), PCP 102 may determine whether to make allocations involving spatial reuse.

As example of such features, FIG. 1 shows PCP 102 sending measurement requests 120*a* and 120*b* to STA 104*a* and 104*b*, respectively. In response, STAs 104*a* and 104*b* send measurement reports 122*a* and 122*b* to PCP 102. These messages are shown for purposes of illustration, and not limitation. Thus, messages may be sent to any combination of STAs 104*a-d* in any number and/or sequence.

In embodiments, a device (e.g., PCP 102) may make allocations based on the amount of isolation among particular beams (as well as other information). For example, a beam pairing must exhibit a sufficiently low amount of isolation to support a wireless link. Further, the device may use such isolation information to establish multiple allocations that reuse resources (e.g., time and/or frequency and/or space). More particularly, information included in such measurement reports may be used to establish a high degree of isolation between each allocation (so that the interference is effectively managed). Examples of varying isolation levels are illustrated below with reference to FIG. 2.

Figure 2:
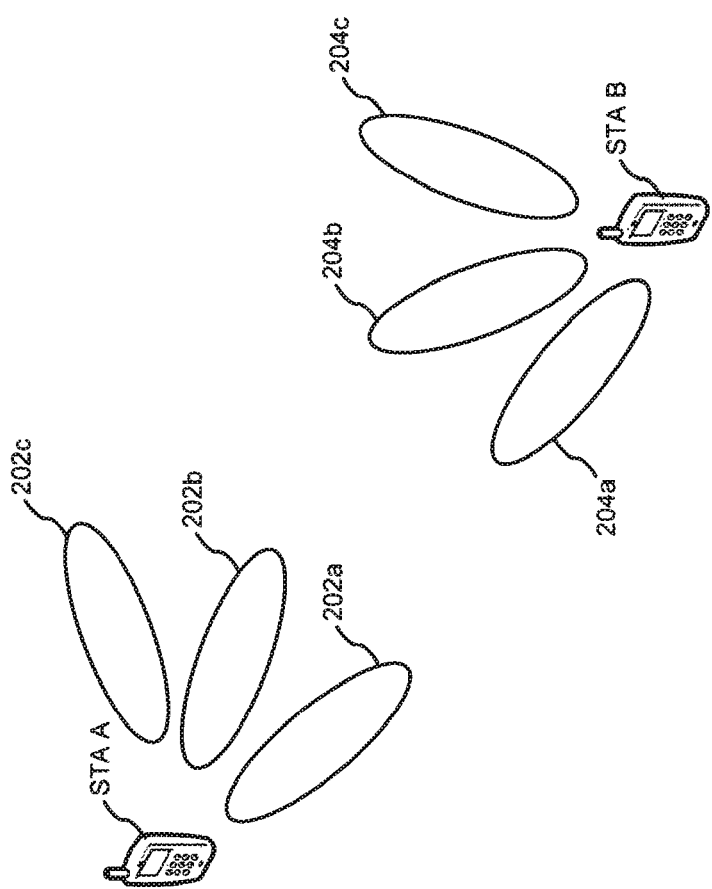
FIG. 2 is a diagram of an exemplary transmission arrangement between two devices.

FIG. 2 is a diagram showing an exemplary wireless arrangement between two devices. In particular, FIG. 2 shows a first station ("STA A") and a second station ("STA B"). These stations may be employed in the context of FIG. 1 (e.g., each as one STAs 104*a-d*).

Between these stations are multiple beams. For instance, FIG. 2 shows that STA A provides transmit beams 202*a-c*. Also, FIG. 2 shows that STA B provides receive beams 204*a-c*. These features are shown for purposes of illustration and not limitation. Through beams 202*a-c*, STA A may engage in one or more directional transmissions. Similarly, through beams 204*a-c*, STA B may receive transmissions from different directions.

FIG. 2 shows nine different pairings of transmit and receive beams between STA A and STAB. Each of these pairings exhibits different levels of isolation. For instance, there is a low amount of isolation between beams 202*a* and 204*a*. This is because these beams are substantially aligned (or overlapping). In contrast, there is a high amount of isolation between beams 202*c* and 204*c*. This is because these beams are unaligned (or non-overlapping). In embodiments, such levels of isolation may be determined through measurements performed by stations (e.g., STAs 104*a-d*). Such measurements may be made in response to requests made by a controlling station (e.g., PCP 102).

Operations for the embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 3:
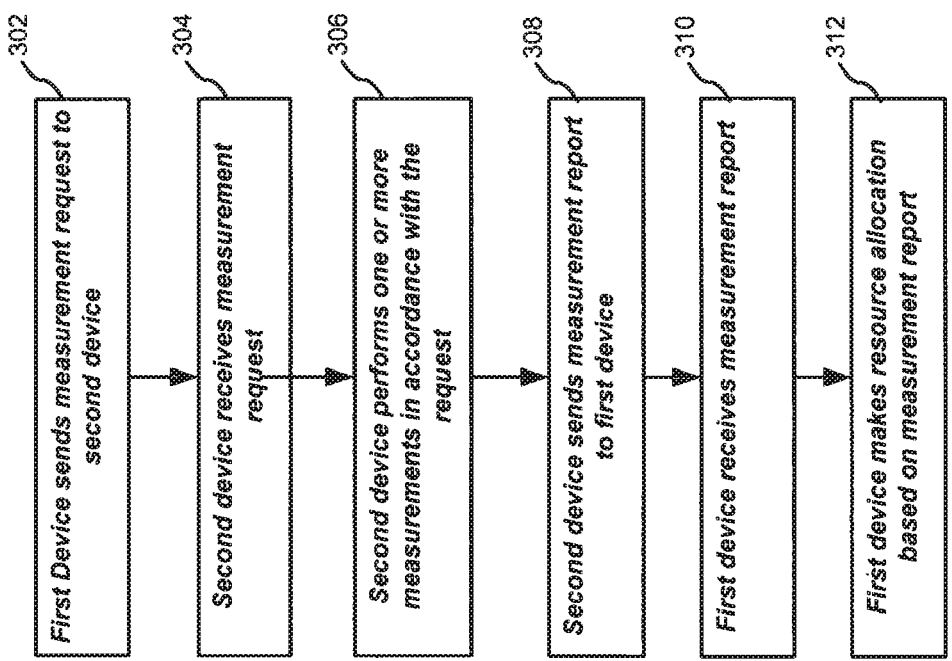
FIG. 3 is a logic flow diagram.

FIG. 3 illustrates an embodiment of a logic flow. In particular, FIG. 3 illustrates a logic flow 300, which may be representative of operations executed by one or more embodiments. This flow is described in the context of FIG. 1. However, this flow may be employed in other contexts.

At a block 302, a first device wirelessly sends a measurement request to a second device. This request directs the second device to perform one or more measurements of a wireless channel. The first device may be a coordinator device for a wireless network (e.g., PCP 102), and the second device may be a user device (e.g., one of STAs 104*a-d*). In embodiments, this request may be a quality histogram request, as described below with reference to FIG. 4. However, embodiments may employ other request formats.

The request may specify one or more characteristics for these one or more measurements. For instance, the request may indicate particular directional and timing characteristics for the measurement(s). Examples of directional characteristics include (but are not limited to) a particular remote device to which the measurement(s) are to be directed, and a beam (e.g., a receive beam) through which the second device is to perform the measurement(s). Examples of timing characteristics include (but are not limited to) a measurement start time, a measurement period duration, and a number of measurements to be taken during the measurement period.

Further, the request may specify when the type of measurement(s) to be taken. Exemplary measurement types include a determination of an Average Noise plus Interference Power Indicator (ANIPI), and/or determination of a Received Signal to Noise Indicator (RSNI). Embodiments, however, are not limited to these measurement types At a block 304, the second device wirelessly receives the measurement request. Following this, at a block 306, the second device performs one or more measurements in accordance with the request.

At a block 308, the remote device wirelessly sends a response (also referred to as a measurement report) to the first device containing the measurement(s). In embodiments, this response may be a quality histogram report, as described below with reference to FIG. 5. However, embodiments may employ other response formats.

The first device receives the response at a block 310. Then, at a block 312, the first device may make one or more resource allocations based on information provided in the response. As described above with reference to FIG. 1, this may involve allocating one or more time slots within a TDMA frame. However, embodiments are not limited to TDMA media access techniques.

FIG. 4 is a diagram showing an exemplary format 400 of a channel quality histogram format request. This format includes multiple fields. For instance, a regulatory class field 402 provides information regarding regulated parameters, such as channel frequency, channel spacing, power limits, and so forth. A channel number field 404 provides information regarding the channel for which measurements are to be taken. Embodiments may format fields 402 and 404 in accordance with Annex J of the IEEE 802.11k Amendment to the IEEE 802.11-2007 Standard. Each of fields 402 and 404 may be one octet in size. However, other sizes may be employed.

As shown in FIG. 4, format 400 further includes a STAID field 406 and a Beam ID field 408. These fields introduce directionality support for RRM measurements.

More particularly, STAID field 406 indicates a STA (e.g., by its MAC address) towards which the RRM request applies. For example, if the measuring STA is beamformed with the STA identified by STAID field 406, then the measurement shall be carried out directionally towards identified STA. In embodiments, STAID field 406 may be set to a broadcast ID (BcastID), in which case the measuring STA will do so through an omni directional pattern. STAID field 406 may be in various formats. For example, in embodiments, STAID filed 406 indicates a MAC address of a STA. FIG. 4 shows that STAID ID field 406 may be one octet in size, which may be an Association ID obtained by the STA once it associated with the PCP. However, other types of identifiers and sizes may be employed.

Beam ID field 408 indicates a beam for which the corresponding measurement request applies. For example, if source and destination STAs have multiple beams between them, Beam ID field 408 identifies one of them. A value of zero (0) in this field indicates that any beam may be used for this measurement. As indicated in FIG. 4, Beam ID field 408 may be one octet in size. However, other sizes may be employed.

Measurement method field 410 indicates the method to be used by the measuring STA in carrying the measurement request, as well as in reporting back to the PCP in the corresponding measurement report. In embodiments, the conventions provided in the IEEE 802.11k Amendment to the IEEE 802.11-2007 Standard may be employed. For example, when field 410 is set to zero (0), Average Noise plus Interference Power Indicator (ANIPI) is designated. However, when this field is set to one (1), Received Signal to Noise Indicator (RSNI) is designated. Other values of measurement field 410 may be reserved for other designations. Measurement method field 410 may be one octet in size. However, other sizes may be employed. Moreover, embodiments are not limited to ANIPI and RSNI. Thus, in embodiments, measurement method field 410 may indicate other measurement types.

Measurement start time field 412 provides RRM support for scheduled access MAC protocols (e.g., TDMA). In the IEEE 802.11k Amendment to the IEEE 802.11-2007 Standard, no Measurement Start Time is defined. Rather a Randomization Interval is included which suits a CSMA/CA MAC protocol. However, for scheduled MAC protocols, a specific Measurement Start Time field is required. Thus, measurement start time field 412 indicates a time when the requested measurement is to commence. In embodiments, a value of 0 indicates that the requested measurement shall start immediately. Measurement start time field 412 may be eight octets in size. However, other sizes may be employed.

Measurement duration field 414 indicates a duration of the requested measurement. In embodiments, such duration may be either mandatory or preferred. As indicated in FIG. 4, measurement duration field may be two octets in size.

Number of time blocks field 416 provides a capability that is advantageous for spatial reuse and interference mitigation, but which is not currently supported in the IEEE 802.11k Amendment to the IEEE 802.11-2007 Standard. In particular, this field indicates the number of time blocks within the total Measurement Duration. A ratio between the measurement duration and the number of time blocks (i.e., the measurement duration divided by the number of Time blocks) provides a duration of each individual measurement to be conducted (also referred to as a measurement unit). As indicated in FIG. 4, field 416 may be one octet in size. However, other sizes may be employed.

In addition to the above fields, format 400 may include a field 418 (of variable size) to convey optional information sub-elements. In embodiments, this field may employ the same convention, as provided by the IEEE 802.11k Amendment to the IEEE 802.11-2007 Standard.

FIG. 5 is a diagram showing an exemplary format 500 of a channel quality histogram format report. This format includes multiple fields. For instance, regulatory class field 502 and channel number field 504 provide information, as described above with reference to fields 402 and 404 of FIG. 4. This information may be formatted as defined in Annex J of the IEEE 802.11k Amendment to the IEEE 802.11-2007 Standard. Each of fields 502 and 504 may be one octet in size. However, other sizes may be employed.

STAID field 506 and Beam ID field 508 indicate the directionality aspect of the measurement report, as described above with reference to fields 406 and 408 of FIG. 4. For instance, STAID field 506 indicates the STA towards which the measurement applies and Beam ID field 508 indicates the beam that was used to perform the measurement. As indicated in FIG. 5, STAID field 506 and Beam ID field 508 may each be one octet in size. However, other sizes may be employed.

Measurement method field 510, measurement start time field 512, measurement duration field 514, and number of time blocks 516 are employed as described above with reference to fields 410-416 of FIG. 4.

FIG. 5 shows that format 500 includes multiple measurement fields. In particular, FIG. 5 shows measurement fields $518_1$-$518_N$ that correspond to each of N time blocks specified in the corresponding channel quality histogram request. Each of measurement fields $518_1$-$518_N$ carries an actual measured value (e.g., an ANIPI value or an average RSNI value).

In addition to the above fields, format 500 may include a field 518 (of variable size) to convey optional information sub-elements. In embodiments, this field may employ the same convention, as provided by the IEEE 802.11k Amendment to the IEEE 802.11-2007 Standard.

Figure 6:
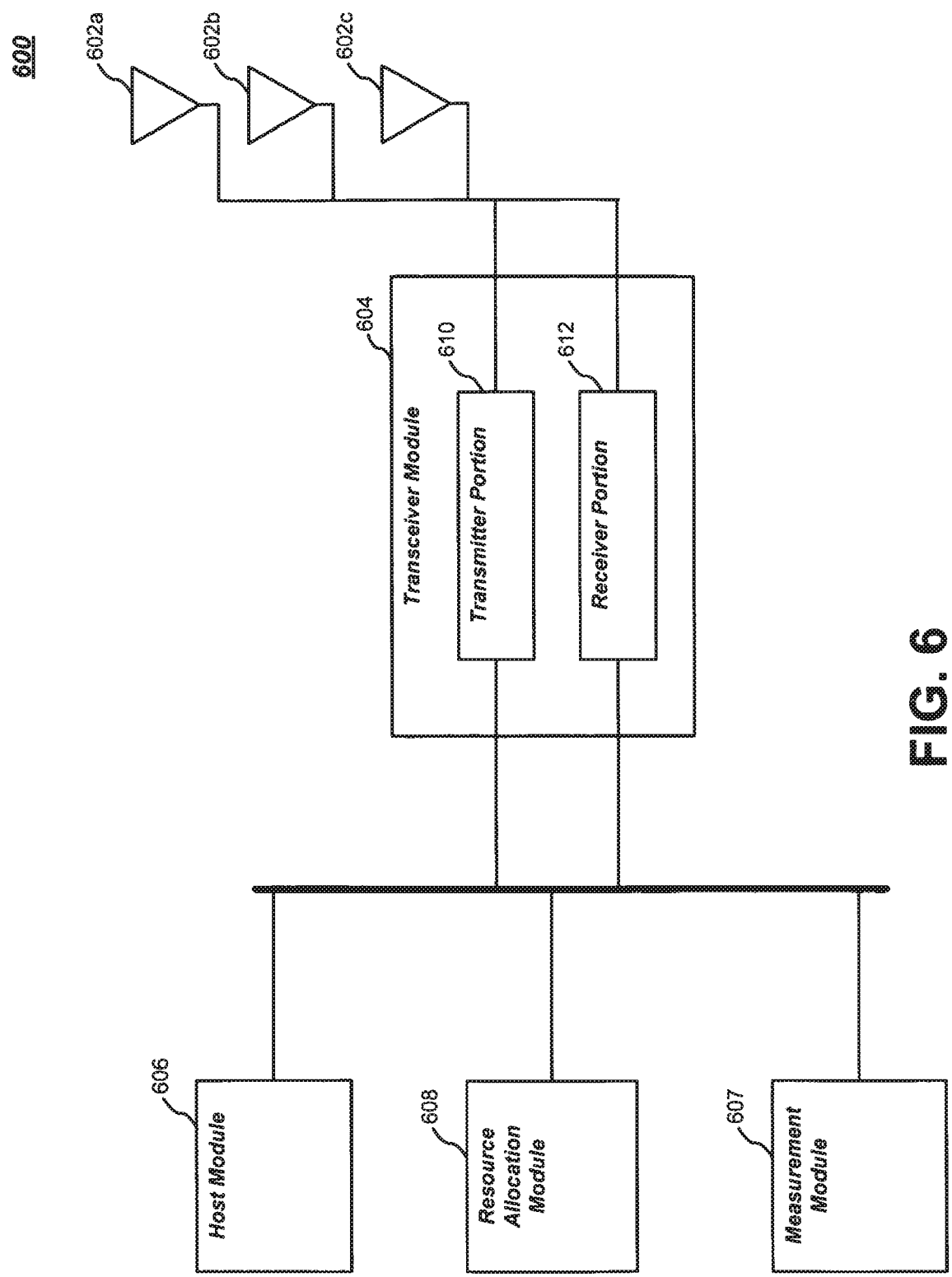
FIG. 6 is a diagram of an exemplary device implementation.

FIG. 6 is a diagram of an implementation 600 that may be included in a wireless device, such PCP 102 and/or STAs 104a-d of FIG. 1. This implementation, however, may be also employed in other contexts. Implementation 600 may include various elements. For example, FIG. 6 shows implementation 600 including multiple antennas 602a-c, a transceiver module 604, a host module 606, a measurement module 607, and a resource allocation module 608. These elements may be implemented in hardware, software, or any combination thereof.

Antennas 602a-c provide for the exchange of wireless signals with remote devices. Although three antennas are depicted, any number of antennas may be employed. Also, embodiments may employ one or more transmit antennas and one or more receive antennas. Such multiple antenna arrangements may be employed for beamforming. For instance, a weight may be set in each antenna may such that the combined output signal provides a corresponding beam.

As shown in FIG. 6, transceiver module 604 includes a transmitter portion 610, and a receiver portion 612. During operation, transceiver module 604 provides an interface between antennas 602a-c and other elements, such as host module 606, measurement module 607, and/or resource allocation module 608. For instance, transmitter portion 610 receives symbols from such elements, and generates corresponding signals for wireless transmission by one or more of antennas 602a-c. This may involve operations, such as modulation, amplification, and/or filtering. However, other operations may be employed.

Conversely, receiver portion 612 obtains signals received by one or more of antennas 602a-c and generates corresponding symbols. In turn, these symbols may be provided to elements, such as host module 606, measurement module 607, and/or resource allocation module 608. This generation of symbols may involve operations, including (but not limited to) demodulation, amplification, and/or filtering.

The signals generated and received by transceiver module 604 may be in various formats. For instance, these signals may be modulated in accordance with an orthogonal frequency division multiplexing (OFDM) scheme or a Single Carrier (SC) scheme. However, other schemes and formats (e.g., QPSK, BPSK, FSK, etc.) may be employed.

To provide such features, transmitter portion 610 and receiver portion 612 may each include various components, such as modulators, demodulators, amplifiers, filters, buffers, upconverters, and/or downconverters. Such components may be implemented in hardware (e.g., electronics), software, or any combination thereof.

The symbols exchanged between transceiver module 604 and other elements may form messages or information associated with one or more protocols, and/or with one or more user applications. Thus, these elements may perform operations corresponding to such protocol(s) and/or user application(s). Exemplary user applications include telephony, messaging, e-mail, web browsing, content (e.g., video and audio) distribution/reception, and so forth.

Moreover, in transmitting and receiving signals, transceiver module 604 may employ various access techniques. For example, transceiver module 604 may employ a scheduled MAC technique, such as TDMA. Embodiments, however, are not limited to such techniques.

Measurement module 607 may perform measurements of wireless resources. Such resources may be specified in accordance with requests received (through transceiver module 604) from a remote device, such as PCP 102 or an IEEE 802.11 access point (AP). As described above, such measurements may be of average noise plus interference power (to provide an ANIPI), and/or of received signal to noise Indicator (to provide an RSNI). However, embodiments are not limited to these measurements. Thus, other wireless channel measurements (e.g., measurements involving any combination of signal power, interference power, and/or noise power) may be made.

Measurements made by measurement module 607 may be from hard symbols received from transceiver module 604 (e.g., based on a bit error rate determined through comparison with a predetermined sequence). Also, such measurements may be based on soft symbols generated by transceiver module 604 from received wireless signals. Moreover, such measurements may be generated from un-demodulated signals provided by transceiver module.

In addition, measurement module 607 may generate a report message that indicates such measurements. This report may be transmitted to the remote device through transceiver module 604.

In embodiments, resource allocation module 608 may perform resource allocation techniques described herein. For example, based on received measurements, allocation module 608 may allocate portions of a communications resource (e.g., time slots within a TDMA frame). Such allocation may include employ reuse that where sufficient isolation exists. Such isolation may be determined through measurements received from remote stations (through transceiver module 604). Allocations may be communicated to remote devices (through transceiver module 604) in control messages.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to IEEE 802.11 networks. Thus, these techniques may be employed in other networks, such as ones that employ any combination of directional transmissions, reuse, and/or scheduled media access techniques.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A device for collecting directional channel quality measurements from one or more station devices, comprising:
   at least one memory that stores computer-executable instructions; and at least one processor configured to access the at least one memory, wherein the at least one processor is configured to execute the computer-executable instructions to:
  generate a directional channel quality request frame comprising one or more measurement fields, wherein the one or more measurement fields indicate a device identification associated with a first station device, at least one measurement method, a measurement start time, and a measurement duration, and wherein the first station device is associated with a first period allocation;
  cause to send the directional channel quality request frame to the first station device, wherein the directional channel quality request frame further comprises a first indication of a first directional channel and indicates that the first station device is to perform the at least one measurement method to measure a quality of the first directional channel from the first station device to a second station device;
  identify a first directional channel quality response received from the first station device, the response comprising a measurement report, wherein the measurement report includes one or more measured values for the first period allocation, the one or more measured values associated with an average noise plus interference power indicator (ANIPI) or a received signal-to-noise indicator (RNSI); and
  determine, based on the measurement report and the first period allocation, a second period allocation that overlaps with the first period allocation, wherein the second period allocation is associated with a second device.

2. The device of claim 1, wherein the at least one processor is further configured to execute the computer-executable instructions to cause to set the measurement method to a first value to indicate an ANIPI measurement type or to a second value to indicate an RNSI measurement type.

3. The device of claim 1, wherein the measurement start time indicates a start time for measuring the quality of the first directional channel.

4. The device of claim 1, wherein the first directional channel is associated with a first beam formed between the first station device and the second station device.

5. The device of claim 4, wherein the one or more measurements fields include a beam identification field associated with the first beam formed between the first station device and the second station device.

6. The device of claim 5, wherein the beam identification field is encoded in a field following the device identification in the directional channel quality request frame.

7. The device of claim 1, wherein the device identification identifies a target station device for performing the at least one measurement method.

8. The device of claim 1, wherein the at least one processor is further configured to execute the computer-executable instructions to cause to set the measurement start time to a first value to indicate an immediate start time of the at least one measurement method.

9. The device of claim 1, further comprising a transceiver configured to transmit and receive wireless signals, wherein the wireless signals comprise at least one of the directional channel quality request frame, the directional channel quality response frame, or the measurement report.

10. The device of claim 9, further comprising one or more antennas coupled to the transceiver.

11. A non-transitory computer-readable medium storing computer-executable instructions that, when executed by at least one processor, configure the at least one processor to perform operations comprising:
  identifying, at a first station device, a directional channel quality request frame received from a device for collecting directional channel quality measurements associated with a first directional channel;
  identifying one or more fields of the directional channel quality request frame, the one or more fields comprising one or more measurement fields, wherein the one or more measurement fields indicate a device identification associated with the first station device, at least one measurement method, a measurement start time, and a measurement duration, the one or more fields further comprising a first indication of the first directional channel and indicating that the first station device is to perform the at least one measurement method to measure a quality of the first directional channel, and wherein the first station device is associated with a first period allocation;
  generate a directional channel quality response comprising a measurement report, wherein the measurement report includes one or more measured value for the first period allocation, the one or more measured values associated with an average noise plus interference power indicator (ANIPI) or a received signal-to-noise indicator (RNSI);
  cause to send the directional channel quality response to the device; and
  identify a second period allocation received from the device, wherein the second period allocation is based on the measurement report and the first period allocation, and overlaps with the first period allocation, and wherein the second period allocation is associated with a second station device.

12. The non-transitory computer-readable medium of claim 11, wherein the operations further comprise identifying a first value for the measurement method to indicate an ANIPI measurement type or a second value for the measurement method to indicate an RNSI measurement type.

13. The non-transitory computer-readable medium of claim 11, wherein the measurement start time indicates a start time for measuring a quality of the first directional channel.

14. The non-transitory computer-readable medium of claim 11, wherein the first directional channel is associated with a first beam.

15. The non-transitory computer-readable medium of claim 11, wherein the one or more measurement fields include a beam identification field encoded in a field following the device identification in the directional channel quality request frame.

16. A method comprising:
  generating, by one or more processors, a directional channel quality request frame comprising one or more measurement fields, wherein the one or more measurement fields indicate a device identification associated with a first station device, at least one measurement method, a measurement start time, and a measurement duration, and wherein the first station device is associated with a first period allocation;
  causing to send the directional channel quality request frame to the first station device, wherein the directional channel quality request frame further comprises a first indication of a first directional channel and indicates that the first station device is to perform the at least one measurement method to measure a quality of the first directional channel from the first station device to a second station device;

identifying a first directional channel quality response received from the first station device, the response comprising a measurement report, wherein the measurement report includes one or more measured values for the first period allocation, the one or more measured values associated with an average noise plus interference power indicator (ANIPI) or a received signal-to-noise indicator (RNSI); and determining, based on the measurement report and the first period allocation, a second period allocation that overlaps with the first period allocation, wherein the second period allocation is associated with a second device.

17. The method of claim 16, further comprising causing to set the measurement method to a first value to indicate an ANIPI measurement type or to a second value to indicate an RNSI measurement type.

18. The method of claim 16, wherein the measurement start time indicates a start time for measuring the quality of the first directional channel.

\* \* \* \* \*